(12) United States Patent
Weil et al.

(10) Patent No.: US 8,261,631 B2
(45) Date of Patent: Sep. 11, 2012

(54) ROTARY MACHINE WITH SEPARATELY CONTROLLABLE STATIONS

(75) Inventors: William W. Weil, Golden, CO (US); Scott J. Woolley, Golden, CO (US); Ian J. Buckley, Littleton, CO (US); James N. McBride, Arvada, CO (US); Bert Johansson, Golden, CO (US); Harley S. Crabtree, Arvada, CO (US)

(73) Assignee: Computrol, Inc., Golden, CO (US)

( * ) Notice: Subject to any disclaimer, the term of this patent is extended or adjusted under 35 U.S.C. 154(b) by 999 days.

(21) Appl. No.: 12/194,380

(22) Filed: Aug. 19, 2008

(65) Prior Publication Data

US 2010/0049357 A1    Feb. 25, 2010

Related U.S. Application Data

(60) Continuation of application No. 11/622,422, filed on Jan. 11, 2007, which is a division of application No. 10/670,176, filed on Sep. 23, 2003, now Pat. No. 7,179,333.

(60) Provisional application No. 60/412,988, filed on Sep. 23, 2002.

(51) Int. Cl.
*B23B 29/24* (2006.01)
*B23Q 16/00* (2006.01)
*B23Q 16/02* (2006.01)
*B23Q 17/00* (2006.01)

(52) U.S. Cl. .......................... 74/825; 74/813 C; 74/816

(58) Field of Classification Search ................ 74/813 R, 74/813 C, 816, 825
See application file for complete search history.

(56) References Cited

U.S. PATENT DOCUMENTS

| | | | |
|---|---|---|---|
| 1,639,118 A | 8/1927 | Troyer et al. | |
| 1,782,450 A | 11/1930 | Taylor | |
| 1,838,082 A | 12/1931 | Coyle | |
| 2,189,283 A | 2/1940 | Eberhart | |
| 2,287,356 A | 6/1942 | Newman | |
| 2,419,951 A | 5/1947 | Kastel | |
| 2,587,538 A | 2/1952 | Seaman | |
| 2,732,315 A | 1/1956 | Birkland | |
| 2,896,378 A | 7/1959 | Keating | |
| 3,001,586 A | 9/1961 | Kyle | |
| 3,048,059 A * | 8/1962 | Cross | 74/819 |
| 3,324,742 A * | 6/1967 | Kavanaugh | 74/665 G |
| 3,412,971 A | 11/1968 | McDivitt | |
| 3,521,598 A | 7/1970 | Straw | |
| 3,575,131 A | 4/1971 | Lohmann | |
| 3,612,479 A | 10/1971 | Smith, Jr. | |
| 3,641,959 A | 2/1972 | Hurst | |
| 3,761,053 A | 9/1973 | Bedo et al. | |
| 3,780,981 A | 12/1973 | Horak et al. | |
| 3,852,095 A | 12/1974 | Hogstrom | |

(Continued)

*Primary Examiner* — Justin Krause
(74) *Attorney, Agent, or Firm* — Russell S. Krajec; Krajec Patent Offices, LLC (57) ABSTRACT

A rotary machine may have multiple stations that have a linear motion operated by a cam and a rotational motion operated by individual motors mounted on each station. Each station may perform a motion profile that is proportional to the machine's central axis rotation or, in some cases, independent of the central axis rotation. In some embodiments, each station may rotate to orient a part prior to processing. In one embodiment, the cam driven linear motion may enable a station to lower for loading and unloading, then raise for processing. The rotary machine may have various mechanisms at each station for processing a part. One such embodiment is a rotary machine that may be outfitted with compound dispensing mechanisms at each station.

13 Claims, 5 Drawing Sheets

U.S. PATENT DOCUMENTS

| | | |
|---|---|---|
| 3,876,144 A | 4/1975 | Madden et al. |
| 4,262,629 A | 4/1981 | McConnellogue et al. |
| 4,295,573 A | 10/1981 | Terry et al. |
| 4,342,443 A | 8/1982 | Wakeman |
| 4,437,488 A | 3/1984 | Taggart et al. |
| 4,498,415 A | 2/1985 | Tsuchiya et al. |
| 4,546,955 A | 10/1985 | Beyer et al. |
| 4,840,138 A | 6/1989 | Stirbis |
| 4,852,773 A | 8/1989 | Standlick et al. |
| 4,884,720 A | 12/1989 | Whigham et al. |
| 4,958,769 A | 9/1990 | Schowiak |
| 5,170,678 A * | 12/1992 | Wawrzyniak et al. ...... 74/813 L |
| 5,197,508 A | 3/1993 | Gottling et al. |
| 5,215,587 A | 6/1993 | McConnellogue et al. |
| 5,263,608 A | 11/1993 | Kiernan et al. |
| 5,272,902 A | 12/1993 | Kobak |
| 5,296,035 A | 3/1994 | Chicatelli et al. |
| 5,419,492 A | 5/1995 | Gant et al. |
| RE35,010 E | 8/1995 | Price |
| 5,455,067 A | 10/1995 | Chicatelli et al. |
| 5,476,362 A | 12/1995 | Kobak et al. |
| 5,533,853 A | 7/1996 | Wu |
| 5,564,877 A | 10/1996 | Hamilton |
| 5,636,447 A | 6/1997 | Yount et al. |
| 5,749,969 A | 5/1998 | Kobak et al. |
| 5,945,160 A | 8/1999 | Kobak et al. |
| 5,995,909 A | 11/1999 | Bretmersky et al. |
| 6,010,740 A | 1/2000 | Rutledge et al. |
| 6,113,333 A | 9/2000 | Rutledge et al. |
| 6,391,387 B1 | 5/2002 | Rutledge et al. |
| 2002/0170385 A1 * | 11/2002 | Dubas et al. .................... 74/816 |
| 2003/0184744 A1 | 10/2003 | Isozaki et al. |
| 2004/0104243 A1 * | 6/2004 | Osborne et al. ................ 222/63 |

* cited by examiner

ROTARY MACHINE WITH SEPARATELY CONTROLLABLE STATIONS

CROSS REFERENCE TO RELATED APPLICATIONS

This patent application is based upon and claims priority to and benefit of pending U.S. patent application Ser. No. 11/622,422 filed 11 Jan. 2007 entitled "Closure Sealant Dispenser" by William W. Weil, et al., which is a divisional application of U.S. patent application Ser. No. 10/670,176 entitled "Closure Sealant Dispenser" by William W. Weil, et al and issued as U.S. Pat. No. 7,179,333 on 20 Feb. 2007, which in turn claims priority to U.S. Provisional Patent Application Ser. No. 60/412,988 entitled "Can Sealant Dispenser" by William W. Weil, et al. filed 23 Sep. 2002, the entire contents of which are hereby specifically incorporated by reference for all they disclose and teach.

BACKGROUND

Rotary processing machines are used in many types of high speed processes, such as in the packaging industry. A rotary machine has a center axis about which multiple stations rotate. Each station may process a unit as the station rotates about the axis. Such machines may be used for various manufacturing processes from forming containers to filling, capping, and labeling, as well as other operations.

SUMMARY

A rotary machine may have multiple stations that have a linear motion operated by a cam and a rotational motion operated by individual motors mounted on each station. Each station may perform a motion profile that is proportional to the machine's central axis rotation or, in some cases, independent of the central axis rotation. In some embodiments, each station may rotate to orient a part prior to processing. In one embodiment, the cam driven linear motion may enable a station to lower for loading and unloading, then raise for processing. The rotary machine may have various mechanisms at each station for processing a part. One such embodiment is a rotary machine that may be outfitted with compound dispensing mechanisms at each station.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A rotary machine with multiple modular stations may use independently controllable motors on each station. The independently controllable motors may enable many different types of motion profiles that may not be readily available or even possible with other types of rotary machines.

The stations may be constructed with a motor and a cam operated linear motion. The cam may cause the station to move linearly as the rotary machine turns about its axis. In one such embodiment, a cam may enable a station to lift a part into place and rotate the part under an applicator or other processor. After the processing is complete, the cam may lower the station into place so that the part may be removed and another part added. Such an embodiment may be useful for depositing liner compound on can ends, lids, caps, and other products.

The types of station motion profiles that may be performed may include constant speed profiles, variable speed profiles, and motion that may be coordinated with other sensors, such as an orientation profile.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
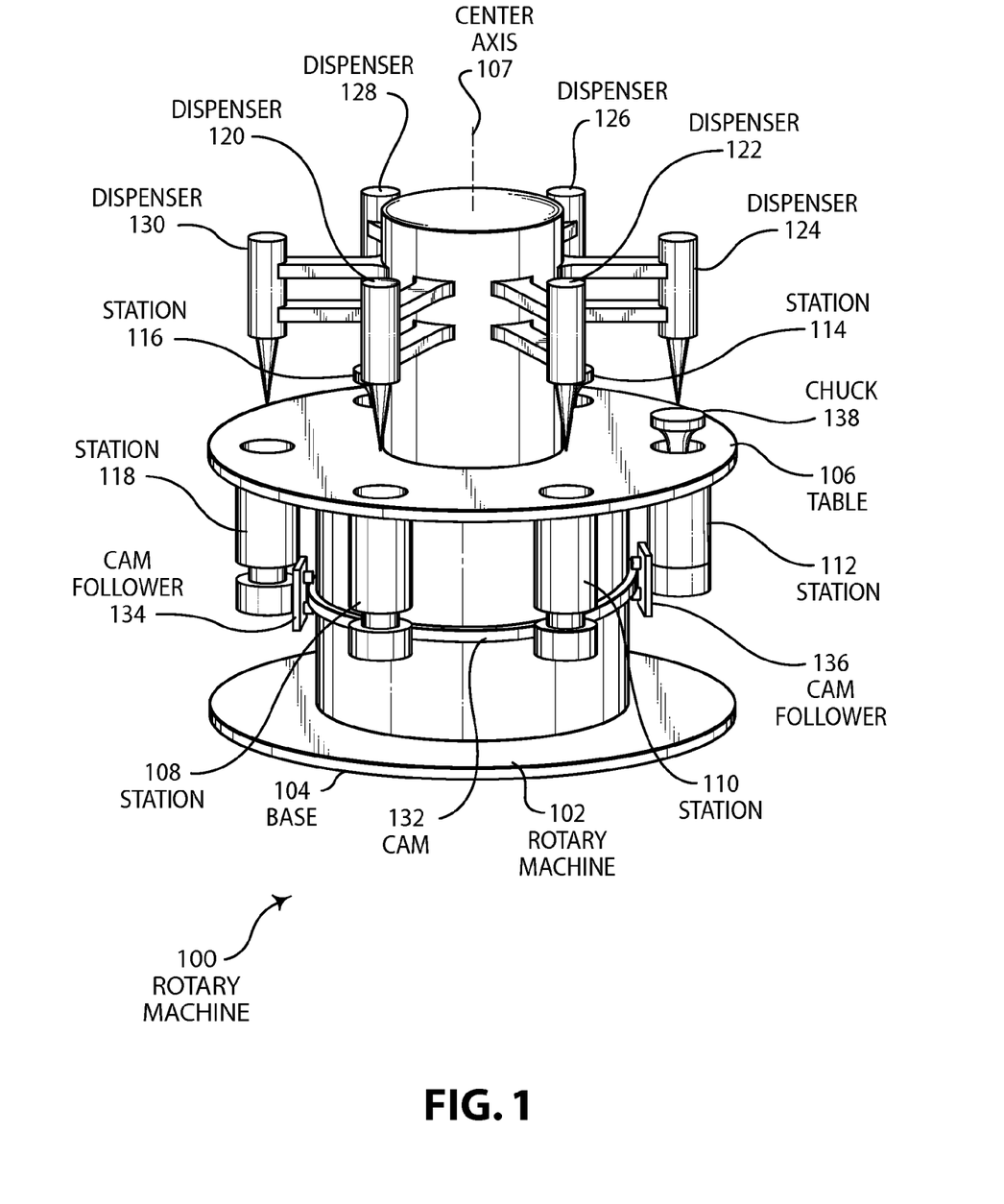
FIG. 1 is a diagram illustration of an embodiment showing an example of a rotary machine.

FIG. 1 is a diagram of an embodiment 100 showing a rotary machine with multiple stations. Embodiment 100 is a simplified example of a rotary machine that has independent motors on each station, plus a cam driven linear motion for each station. Embodiment 100 is an example of a rotary machine that may be used to apply liner compound, for example. Many other embodiments may perform different functions using similar or different configurations.

The rotary machine 102 has a base 104 on which a table 106 may rotate. Disposed around the center axis 107 are stations 108, 110, 112, 114, 116, and 118. The portion of the machine 102 above and including the table 106 may rotate at a constant speed, while each station may process a single part as the rotary machine 102 rotates about the center axis 107.

A motor may be used to cause the rotary machine 102 to rotate about the center axis 107. Such a motor may be mounted inside the base 104 or may be externally mounted. In many cases, a belt drive or gear drive transmission may be used to couple the main drive motor to the rotating portion of the rotary machine 102.

Figure 3:
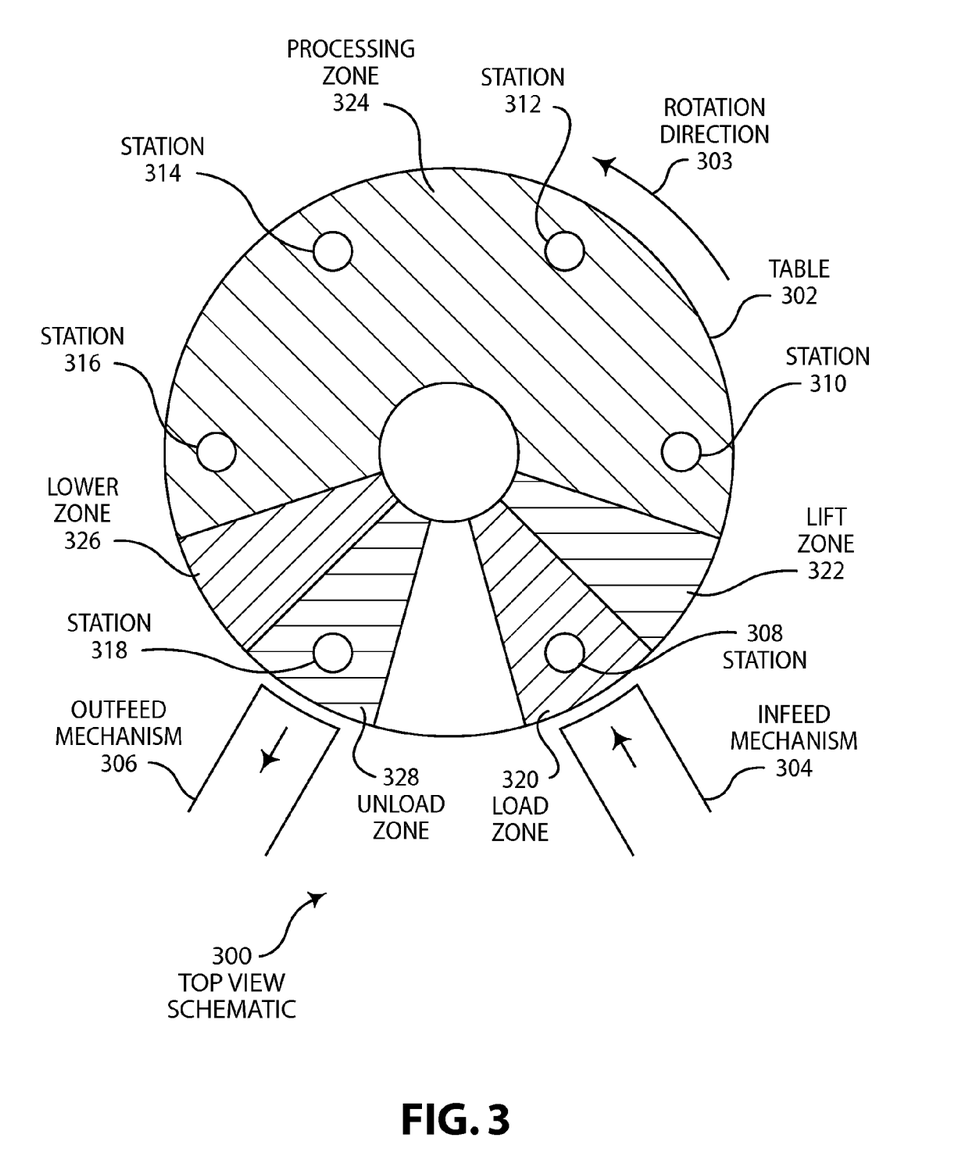
FIG. 3 is a top view diagram illustration of an embodiment showing a rotary machine with various operational zones.

As the stations progress around the center axis, the stations may pass a loading zone where a part to be processed may be loaded onto a station. The station may pass a lifting zone where the station may lift the part into position for processing, and a processing zone where the part undergoes processing. After processing, the station may rotate past a lower zone and then to an unload zone. An example of such a progression is illustrated in FIG. 3 of this specification.

The rotary machine 102 is an example of a six station rotary machine. Other embodiments may have 3, 4, 8, 10, 16, 32, or any other number of stations. The number of stations is roughly correlated with the throughput of the overall machine. As the number of stations doubles, the machine may be able to process about twice as many items.

The rotary machine 102 is designed with the stations mounted under the table 106. In this embodiment, parts to be processed are placed on top of the stations in a chuck, such as the chuck 138 illustrated in station 112. The chuck 138 may grasp or hold a part to be processed.

In other embodiments, the stations may be placed above the part to be processed. For example, a screw cap installation embodiment may install a threaded cap onto a container. In the example, the cap may be loaded into a chuck operated by a station mounted above the container. The container may be presented below the screw cap and the station may rotate the cap onto the container.

The rotary machine 102 is illustrated with dispensers 120, 122, 124, 126, 128, and 130 at stations 108, 110, 112, 114, 116, and 118, respectively. The dispensers may apply sealing compound to can ends that may be held at each station. The stations may hold a can end, lift the can end underneath a dispenser, and rotate the can end while the dispenser dispenses sealing compound.

The rotary machine 102 has a cam 132 that is located on the base 104. Each station may have a cam follower, such as cam followers 134 and 136 on stations 118 and 112, respectively. The cam 132 and cam followers may cause the stations to move in a linear motion with respect to the table 106 based on the location of the station around the rotary machine 102. When the stations are in the locations of stations 118, 108, and 110, the cam may cause the stations to be in a lower position than when the stations are in the position of stations 112, 114, and 116.

The cam 132 and cam follower mechanisms may cause the stations to move in a linear motion during a rotation about the center axis 107. The illustrated embodiment shows the cams causing a linear motion parallel to the center axis 107. Other embodiments may have a linear motion in a direction perpendicular to the center axis 107. Still other embodiments may have linear motion in other directions.

In some embodiments, a servo motor, solenoid, or other actuator may be used to generate linear motion. In many embodiments, a bearing system may be used to guide the linear motion.

Each station may have a separately controllable motor for controlling the station rotation. In different embodiments, each station motor may be a servo motor, stepper motor, fixed speed, or some other type of controllable motor. A controller may be able to operate the station motors in several different modes using motion profiles.

In a first mode, the station motors may be caused to rotate proportionally to the center axis rotation of the rotary machine. In such a mode, the motion profile of the station may be a multiplier of the rotation of the center axis. The rotational speed of the center axis may be used as an input to the controller to determine the rotational speed of the stations.

In some embodiments, a sensor on the rotary machine 102 may detect the speed or position of the rotation about the center axis 107. In some embodiments, the calculation or determination of the movement of station motors may be calculated using either speed or position. When position is sensed, speed may be calculated. When speed is sensed, it may be more difficult to calculate position, as a secondary position sensor may be used.

In the first mode of operation, as with other modes of operation, a controller may use either speed or position as an input, and the controller may control station motors using speed or position as an output.

In a second mode of operation, the station motors may be caused to rotate at a constant speed regardless of the speed of rotation of the center axis. In an example, each station may be set to rotate at a constant speed regardless of the table rotation speed.

In other modes of operation, the station motors may be caused to rotate on a variable speed profile. A variable speed profile may change station motor speed while the station progresses around the center axis.

In one example of a variable speed profile, the station speed may be set at a slow speed or even stopped during the load and unload phase, but may increase to a high speed during the processing phase. A variable speed profile may define the acceleration or how fast the speed is increased or decreased, and may define a specific period of time to hold each speed.

A variable speed profile may be defined in many different manners. In one manner, an initial speed may be defined for a load process. At a predetermined point, such as when the station passes a sensor or moves past the load area, the speed may be ramped up at a predetermined rate, held at a constant speed, then ramped down to the initial speed.

In some cases, the points at which a speed profile changes may be defined with different types of input. For instance, some variable speed profiles may be defined with respect to time. In the previous example, the high speed portion of a speed profile may be held for a predetermined time. In another instance, the high speed portion of the speed profile may be held for a specific number of turns or rotations. In still another instance, the high speed portion of the speed profile may be held constant until the station passes a sensor or a predetermined location around the center axis.

In each instance given above, the manner in which a speed profile is defined may change the actual motion of the station motor in different cases, such as when the machine is slowed down or sped up. In the case of a rotary machine 102 where compound is being dispensed, some embodiments may program a variable speed profile to perform a certain number of turns during a compound dispensing operation at a specific speed, for example.

In some embodiments, a variable speed profile may be adjusted based on the rotation about the center axis. In such an embodiment, the variable speed profile may be defined for a maximum operating speed of the rotary machine 102, and the actual speed of the station may be decreased by a percentage calculated by the current speed divided by the maximum speed. In such an embodiment, the motion of the station motors may be slowed proportionally with the speed of the table.

In some embodiments, a variable speed profile may be performed the same manner regardless of the rotation about the center axis. In such an embodiment, a speed profile may be started when a station reaches a predetermined position around the center axis. For example, once a station was raised into place, the speed profile may be executed from an initial speed and may return to the initial speed until the unload and load operations are completed.

Such an embodiment may be useful in cases where the speed profile is important in performing a process. For example, a dispensing operation may use a dispenser that dispenses a compound at a predetermined flow rate and for a predetermined period of time. By operating the speed profile at the same speed and duration regardless of the speed of the rotary machine about the center axis 107, the compound may be dispensed consistently regardless of the table rotation speed.

In some embodiments, a variable speed profile may include an operation to orient the part. When a part is oriented, the part may be turned or positioned to a specific orientation prior to performing an operation. A part may be received, positioned to a starting orientation, then have an operation performed.

Orientation operations may use some type of sensor to determine the proper position of a part. In some cases, a part may have an orientation feature that may be detected by a sensor. For example, a part may have a tab or some protrusion that may be sensed by a mechanical switch or proximity probe. In another example, a part may have a marking or feature that may be sensed using a vision system. Many different sensing mechanisms may be used depending on the features or characteristics of the part being handled.

The rotary machine 102 is illustrated with a table 106 that is both flat and continuous. In many embodiments, the table 106 may be implemented as individual mounting brackets or any other mechanism to which stations may be attached. Any references to a 'table' in the specification and claims shall include any mechanism by which a station may be attached to the center rotating element of a rotary machine. Such a 'table' may not be planar nor continuous.

Figure 2:
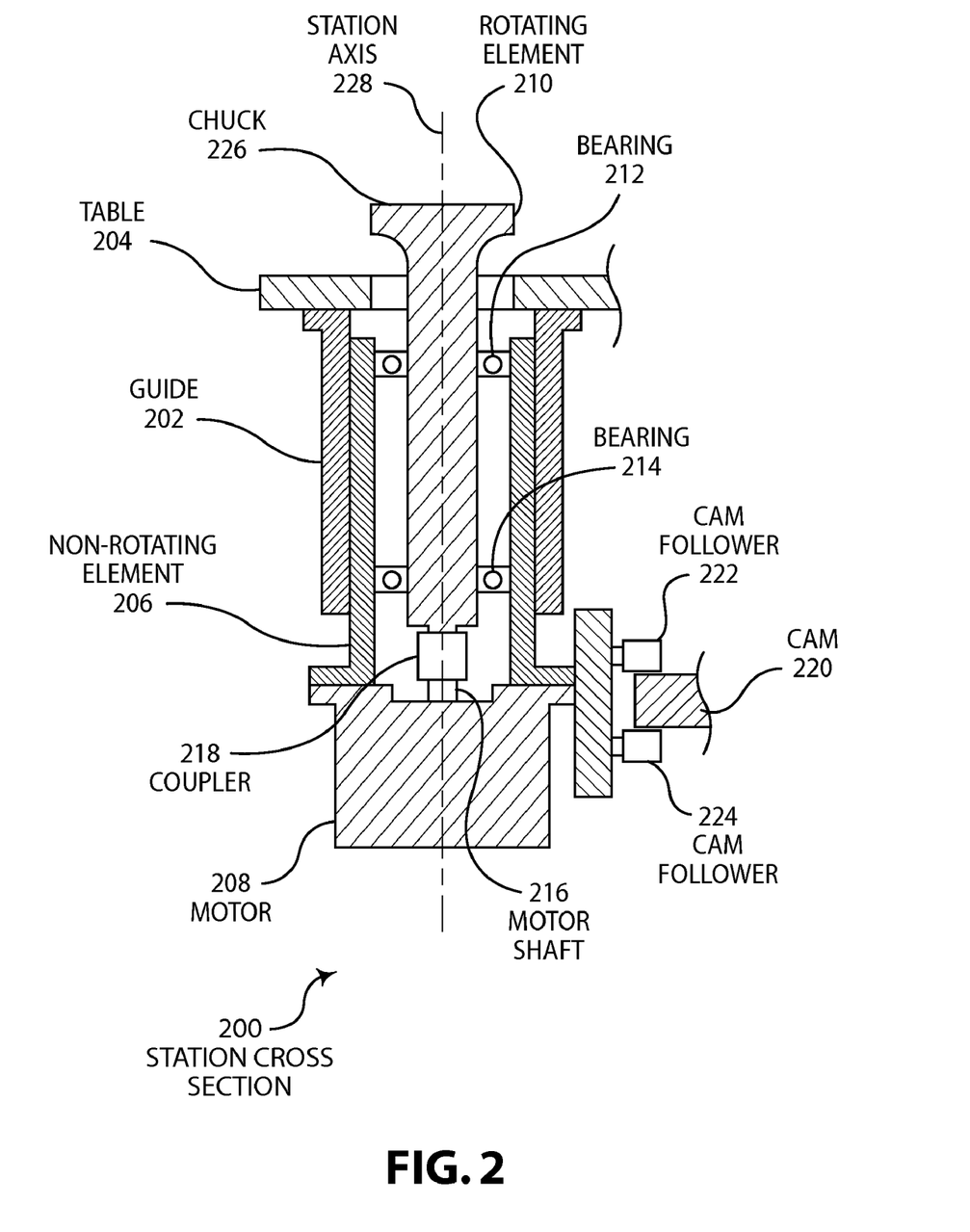
FIG. 2 is a cross sectional diagram illustration of an embodiment showing a station with an individually controllable motor and a cam driven linear motion.

FIG. 2 is a cross-section diagram of an embodiment 200 showing a station mechanism. Embodiment 200 is a simplified example of a station mechanism that includes a controllable station motor and a linear motion that is cam driven. Embodiment 200 is an example of a station such as station 110 of embodiment 100.

Embodiment 200 illustrates the major components of one example of a station. Some details such as fasteners and other mechanical connections are omitted, as well as electrical or other types of connections.

The station of embodiment 200 may have a guide 202 that may be rigidly connected to a table 204. A non-rotating element 206 may slide vertically within the guide 202. The non-rotating element 206 may be connected to a station motor 208 that drives a rotating element 210.

The guide 202 may enable the non-rotating element to move vertically as driven by a set of cam followers 222 and 224 that may ride along the cam 220. In many embodiments, the non-rotating element 206 may have a keying mechanism, linear bearing, or some other mechanism that may enable the non-rotating element 206 to move linearly with respect to the guide 202 yet may not allow the two parts to rotate with respect to each other.

The cam followers 222 and 224 are illustrated as being offset from the station axis 228. In many such embodiments, springs may be used to help support the non-rotating element 206 and minimize effects due to a torque moment being applied by an off-axis cam follower.

The rotating element 210 may be mounted in a set of bearings 212 and 214 and engage the motor 208 with a coupler 218. The rotating element 210 may rotate about the station axis 228.

The rotating element 210 may have a chuck 226 which may hold a part to be processed. In some embodiments, the chuck 226 may have a tool or other mechanism that may perform an operation on a part to be processed. In some embodiments, the chuck 226 may hold a part to be operated on by a tool mounted in the position of the dispenser 124 as in embodiment 100. The configuration of the chuck 226 may vary considerably from one embodiment to another, depending on the type of operation, the part being processed, and other factors.

In the embodiment 100, the station axis 228 may coincide with a centerline or major axis of a part to be processed. In some embodiments, the station axis 228 may be offset from an axis of a part to be processed. In some embodiments, the station axis may be not parallel with any axis of the part to be processed.

The embodiment 100 illustrates an example where the station axis 228 may be parallel with the center axis of a rotary machine. In other embodiments, the station axis 228 may be perpendicular to the center axis of a rotary machine or may have some other orientation.

Embodiment 200 illustrates an embodiment where the station axis 228 is vertical and where the station may be mounted below the chuck 226. In other embodiments, a station may be mounted above a part to be processed.

In many embodiments, the station may hold a part to be processed in the chuck 226. In other embodiments, the chuck 226 may hold a tool, processing element, or some other mechanism that may act upon a part to be processed.

In many embodiments, the station of embodiment 200 may be constructed in modular or unitized manner. A modular station may be quickly removed and replaced on a rotary machine, such as rotary machine 102. The unitized or modular design of embodiment 200 has a single connection point between the guide 202 and table 204. By disconnecting the guide 202 from the table 204, the station may be quickly and easily removed from a rotary machine.

A modular or unitized station design may be used with a compound dispensing rotary machine, such as embodiment 100. In such an embodiment, a rotary machine may have multiple stations that may have cam actuated linear motion along with independently controllable station motors. The stations may be constructed so that one station may be removed from the rotary machine while leaving the other stations in tact on the rotary machine.

FIG. 3 is a top view schematic diagram of an embodiment 300 of an example of a rotary machine. Embodiment 300 may illustrate the operations performed on the stations as the stations progress around a rotary machine.

A rotary machine may perform a sequence of processes on a station as the station rotates about the center axis of the rotary machine. At each station on the rotary machine, a single part or set of parts may be processed.

Embodiment 300 illustrates a top view of a rotary machine that has a table 302. The table 302 may rotate counter clockwise as indicated by the rotation direction 303. As the various stations rotate about the rotary machine, each station may process a part in a sequence. Embodiment 300 is an example of a rotary machine that may have six stations 308, 310, 312, 314, 316, and 318. As the stations rotate in the rotation direction 303, each station may perform a sequence of activities.

An infeed mechanism 304 may provide parts to be processed. In many cases, the infeed mechanism 304 may be a conveyor system that may feed parts from other processing stations. Many different types of infeed mechanisms may be used depending on the particular application.

As a station moves through the load zone 320, a part to be processed may be presented to the station and loaded into the station. In embodiment 300, station 308 may be performing such an action.

After loading in a part in the loading zone 320, a lift zone 322 may lift the station into position for processing. The lift zone 322 may cause a station to move linearly to engage a tool, processing mechanism, part to be processed, or other purpose. The lift zone 322 may be where a cam follower mechanism may raise or lower a station that contains a part to be processed.

After progressing through a lift zone 322, a station may continue through a processing zone 324 where the station may perform a processing operation on a part. In the example of embodiment 100, stations 112, 114, and 116 are illustrated in a processing zone and may be applying sealing compound to a part such as a can end. In embodiment 300, stations 310, 312, 314, and 316 may be in the processing zone 324.

After the processing zone 324, a station may progress through lower zone 326. In the lower zone 326, a station may be retracted, lowered, or otherwise disengaged from a processing position.

After the lower zone 326, a station may continue into an unload zone 328. In the unload zone 328, a part may be unloaded from a station and removed through an outfeed mechanism 306. The outfeed mechanism may be any mechanism or system through which a part may be removed from a station. In many cases, the outfeed mechanism may include a conveyor system for moving parts to further processing stations.

Embodiment 300 is an example of a rotary machine that may be used with a station such as the station of embodiment 200.

During the operation of a station through the sequence of embodiment 300, each station may have an individually controllable motor that may be controlled by a controller to operate in several different modes. The motor may cause a rotation of an element on the station. In many cases, the rotation action may cause the part to be processed to be rotated. In other cases, a tool or other mechanism may be caused to rotate as part of a processing operation on a part.

A controller may sense the speed or position of the table 302 in order to cause the rotational elements of the various stations to rotate.

In many embodiments, the rotary motion of the table 302 may be sensed using an encoder or other device that may resolve the position or motion of the table 302 in various manners and with various resolutions.

In a simple embodiment, a fixed mounted sensor on a non-rotating base of a rotary machine may sense the position of a marker or other indictor that may be mounted on the table 302. In such an embodiment, the sensor may sense each time the table 302 passed the sensor and a controller may be able to determine the speed of the table 302 and deduce the position of the table with some accuracy.

In a more complex embodiment, an optical encoder may be mounted such that the position of the table 302 may be determined. By knowing the position of the table 302 and calculating the rate of change of position, the speed of the table 302 may be calculated.

The position of a station may be used as an input to a controller that may control the rotary action of a station motor. For example, when a station is in the load zone 320 or unload zone 328, the rotation of a station motor may be one speed, while the station motor may be operated at a different speed when the station is in the processing zone 324.

The rotational speed of the table 302 may also be used as an input to a controller. In some embodiments, the station motors may be proportional to the rotational speed of the table 302. In such embodiments, the station motors may stop rotation when the table 302 is stopped, but may slowly increase proportional to the speed of table 302 until the table 302 reaches normal operating speed.

In some embodiments, a variable motion profile may be performed by a station motor. A variable motion profile may cause the station motor to be changed while the station progresses through a full rotation of the table 302.

In many cases, a variable motion profile may use the rotational speed of the table 302 as an input. In one example, a variable motion profile may be performed at a speed proportionally to the table rotational speed.

In some cases, a variable motion profile may use positional information to determine station motor operation. For example, a variable motion profile may have a load speed defined that is performed from through the unload zone 328 and the load zone 320. After the station completes the lift zone 322, a variable speed motion profile may be initiated. In some such cases, the motion profile may be performed proportionally to the table rotation speed and in other cases, the motion profile may be performed at a predetermined speed profile regardless of the table rotation speed.

Figure 4:
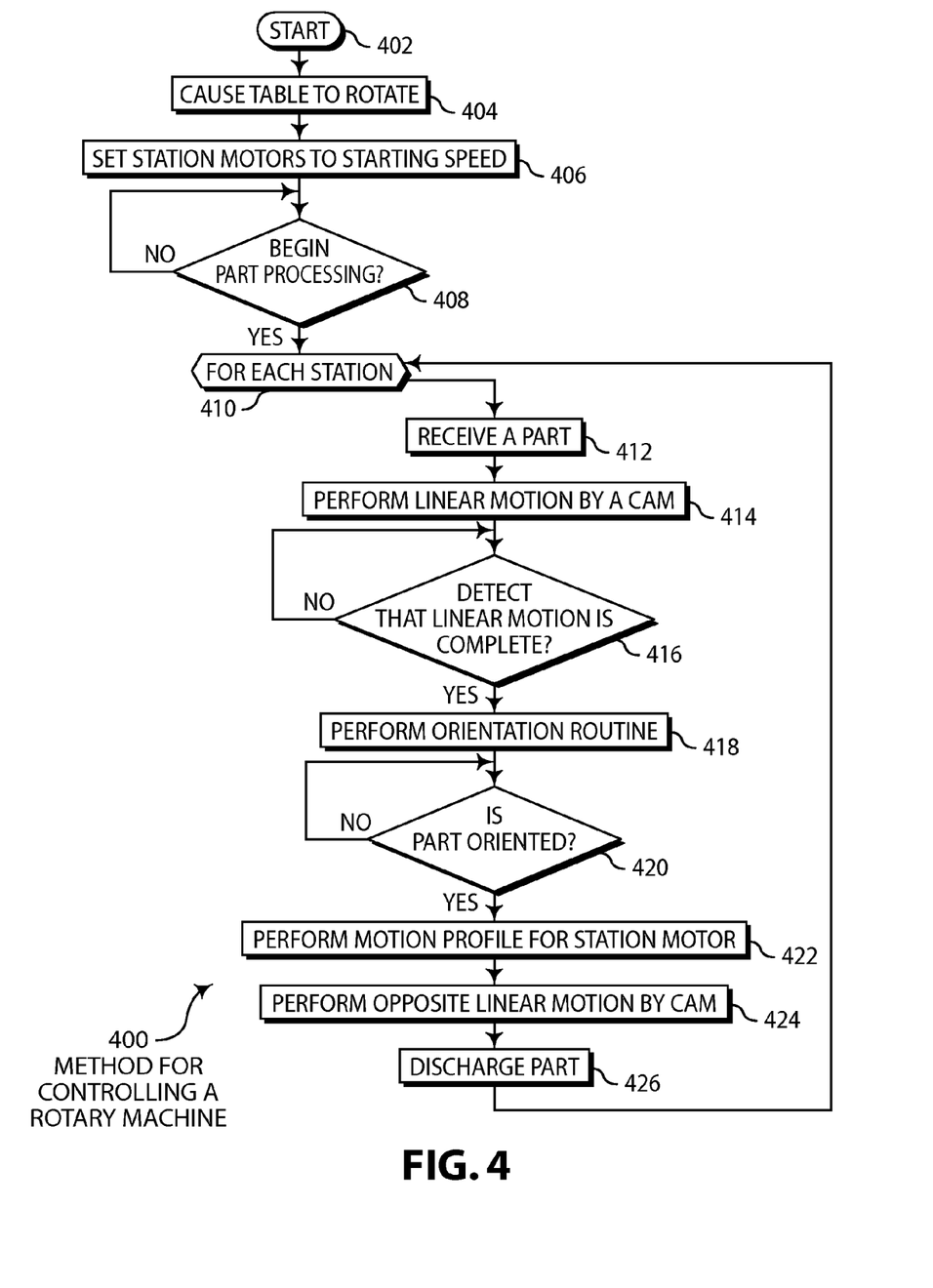
FIG. 4 is a flowchart illustration of an embodiment showing a method for controlling a rotary machine.

FIG. 4 is a flowchart illustration of an embodiment 400 showing a method for controlling a rotary machine. Embodiment 400 is a simplified example of a method that may be used for controlling a rotary machine that has a cam lift mechanism and individually controllable station motors.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A rotary machine may be started in block 402. The main table of the rotary machine may be caused to rotate in block 404 and the station motors may be set to a starting speed in block 406.

Embodiment 400 illustrates a method where a rotary machine may be started up to a processing speed before performing operations on parts to be processed. Other embodiments may enable a rotary machine to receive parts prior to the machine reaching operational speed.

When part processing begins in block 408, each station may be similarly processed in block 410.

For each station in block 410, a part may be received in block 412. In many embodiments, a sensor may detect that a part is properly placed in a station. In some embodiments, the motion profile of a station motor may not be performed if a part is not sensed in the station. In other embodiments, the motion profile may be performed whether or not a part is properly positioned.

In block 414, a linear motion on the station may be performed by a cam. The cam may be actuated by the motion of the rotary table and by a cam follower mechanism that may be attached to the station. The linear motion may be a function of the rotational position of the station about the table.

In block 416, the linear motion may be completed and detected. In some cases, the linear motion may be detected by a proximity sensor, microswitch, or some other independent sensing mechanism. In other cases, the position of the station may be sensed from the rotational position of the table, and the station position may be sufficient to determine that the cam motion is in a proper position to begin a motion profile.

An orientation routine may be performed in block 418. An orientation routine may rotate the station motor until a part is properly oriented. When the part is properly oriented in block 420, the motion profile may be performed in block 422.

The orientation routine of block 418 may move the station motor until the orientation of a part is proper prior to processing. In some embodiments, a video sensor, proximity sensor, or other mechanism may be used to determine when the part is in a proper location for processing.

For example, a part may be loaded onto a rotating chuck in block 412, and raised into position in block 414 for processing, such as dispensing sealing compound onto a part such as a can end. A sensor such as a video sensor may determine the orientation or the can end in the chuck and begin dispensing compound when the part reaches a certain orientation while the can end is rotating.

The motion profile of block 422 may be independent of the rotational speed of the table. In other embodiments, the motion profile may be slowed down in proportion to the actual rotational speed of the table divided by the maximum or operating speed of the table.

The opposite linear motion may be performed by the cam mechanism in block 424 and the part may be discharged or unloaded in block 426.

The process for an individual station may return to block 410. When multiple stations are used on a rotary machine, each station may be operated according to the process of blocks 412 through 426.

Figure 5:
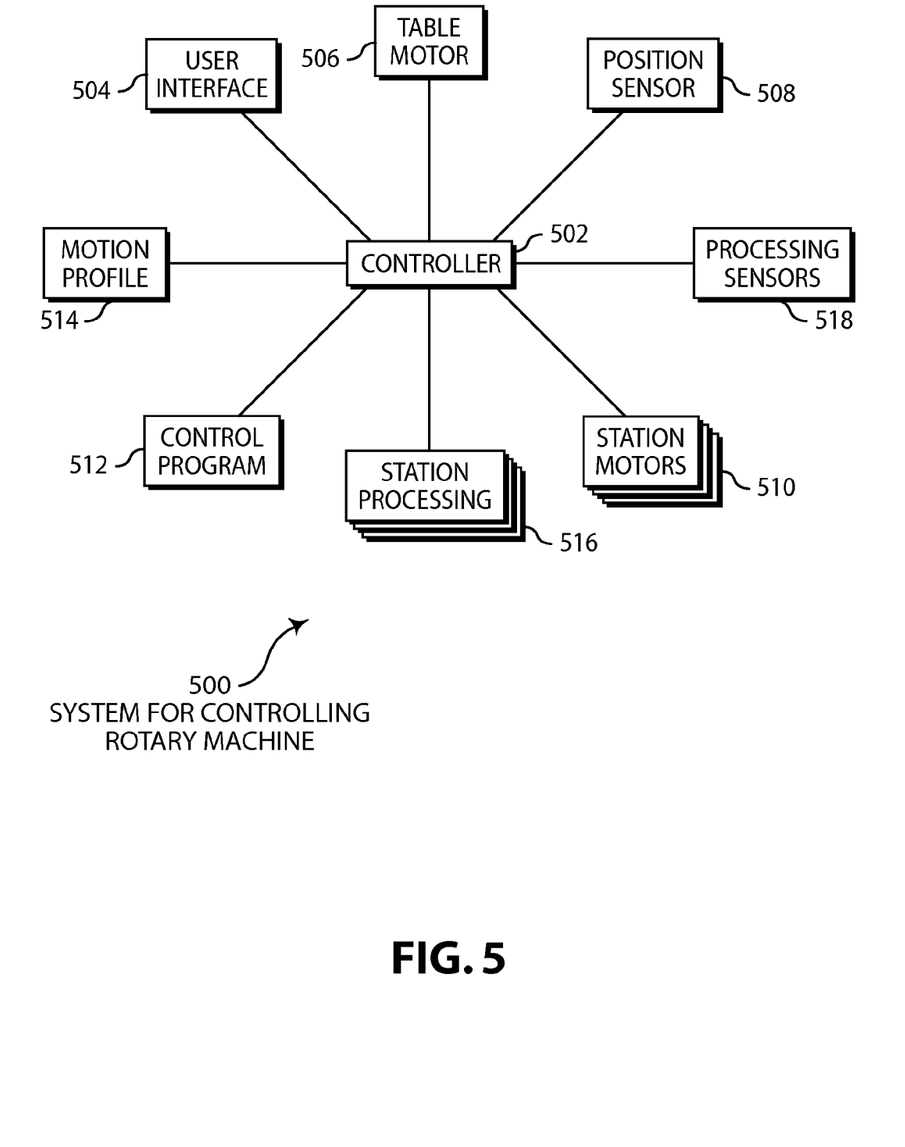
FIG. 5 is a diagram illustration of an embodiment showing a system for controlling a rotary machine.

FIG. 5 is a diagram illustration of an embodiment 500 showing a system for controlling a rotary machine. Embodiment 500 is a simplified example of various functional components that may make up a control system.

The diagram of FIG. 5 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

A controller 502 may monitor and control the various operations of a rotary machine. The controller 502 may be any type of device, including programmable devices operating software, that may control a rotary machine. In some embodiments, the controller 502 may be a hardware device such as a state machine, field programmable gate array, integrated circuit, or some other architecture.

The controller 502 may have a user interface 504 for receiving commands and displaying status. In many embodiments, the user interface 504 may be a box of buttons and lights that may be used by an operator to start, stop, and otherwise control the rotary machine. In some embodiments, the user interface 504 may be a graphical user interface that may be on a console monitor or may be accessed over a network.

The controller 502 may cause a table motor 506 to operate. The table motor 506 may cause the main table of a rotary machine to rotate. The controller 502 may be capable of starting, stopping, and changing the speed of the table motor 506. In some embodiments, the table motor 506 may be controlled by another device, such as when a rotary machine is driven from a drivetrain that may operate several machines.

A position sensor 508 may be attached to the rotating table and used to resolve the position and speed of the rotary table. In many embodiments, an optical encoder may be used, but many other sensors may also be used.

The controller 502 may control the position and speed of the station motors 510. The position and speed of the station motors 510 may be individually controlled, enabling the controller 502 to have one station motor operate at one speed while another station motor is operated at a second speed.

The operation of the controller 502 may be defined in a control program 512. In many embodiments, a control program 512 may be used to update or change the operational characteristics, sequences, and other aspects of a rotary machine. In many cases, a motion profile 514 may be separately defined from the control program 512. The motion profile 514 may define the motion performed by the station motors 510 during operation.

In many embodiments, the controller 502 may control additional station processing 516 and may use inputs from various processing sensors 518. The station processing 516 may include controlling other mechanisms that perform processing operations on the stations. For example, the controller 502 may cause a compound dispenser to start and stop dispensing in conjunction with the motion profile being performed by a station motor.

Embodiment 500 is a simplified and high level example of a system architecture that may be used to operate and control a rotary machine.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A rotary machine comprising:
 a table having a center axis and being configured to rotate about said center axis, said table comprising a plurality of stations disposed about said center axis;
 a first motor connected to drive said table to rotate about said center axis;
 a position sensor for said table, said position sensor capable of resolving a rotational position of said table;
 a cam;
 each of said stations comprising:
  a non-rotating guide attached to said table;
  a rotating element configured to rotate within said non-rotating guide, said rotating element revolving about a station axis;
  a station motor configured to cause said rotating element to rotate with respect to said non-rotating guide; and
  a linear slide configured to enable said non-rotating guide to linearly move along a linear axis with respect to said table; and
 a controller configured to cause said first motor to rotate said table at a first speed and cause said station motors to rotate according to a motion profile.

2. The rotary machine of claim 1, said motion profile being performed at a speed proportional to said first speed.

3. The rotary machine of claim 1, said motion profile being performed at a speed independent of said first speed.

4. The rotary machine of claim 1, said motion profile being a constant speed profile.

5. The rotary machine of claim 1, said motion profile being a variable speed profile.

6. The rotary machine of claim 1, said motion profile comprising an orientation routine.

7. The rotary machine of claim 1, said motion profile being dependent on said rotational position of said table.

8. The rotary machine of claim 1, said stations being substantially below said table.

9. The rotary machine of claim 1, said station axis being substantially parallel to said center axis.

10. The rotary machine of claim 9, said linear axis being substantially parallel to said center axis.

11. The rotary machine of claim 10 further comprising:
 a compound dispenser at each of said stations.

12. The rotary machine of claim 1, said cam comprising a cam path generally circular in shape and substantially centered about said center axis.

13. The rotary machine of claim 1, said linear axis being substantially perpendicular to said center axis.

* * * * *